T. J. HARTON.
ICE CREAM FREEZER.
APPLICATION FILED JAN. 18, 1909.

966,912.

Patented Aug. 9, 1910.

Witnesses
W. G. Jones
M. K. Freeman

Inventor
Thomas Jefferson Harton
By Louis Bagger & Co.
Attorneys

THE NORRIS PETERS CO., WASHINGTON, D. C.

UNITED STATES PATENT OFFICE.

THOMAS JEFFERSON HARTON, OF ST. LOUIS, MISSOURI.

ICE-CREAM FREEZER.

966,912.   Specification of Letters Patent.   Patented Aug. 9, 1910.

Application filed January 18, 1909. Serial No. 472,944.

*To all whom it may concern:*

Be it known that I, THOMAS JEFFERSON HARTON, a citizen of the United States, residing at St. Louis, in the State of Missouri, have invented certain new and useful Improvements in Ice-Cream Freezers, of which the following is a specification.

My invention relates to an improvement in ice cream freezers, and the object is to provide means whereby the receptacle can be rocked, causing the water from the melting ice to come in contact with the receptacle or receptacles containing the cream.

The invention consists of certain novel features of construction and combinations of parts which will be hereinafter described and pointed out in the claims.

Figure 1:
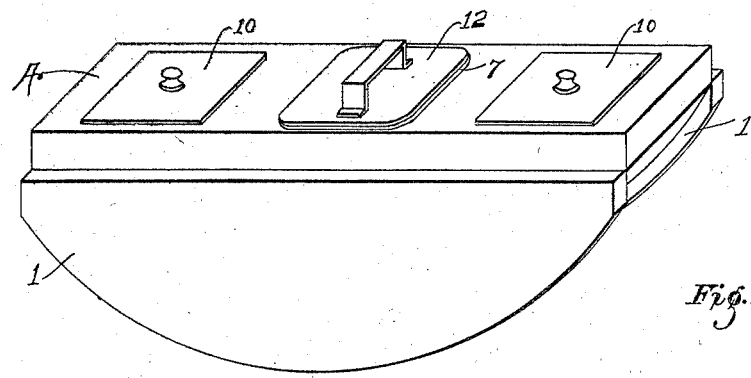
Figure 2:
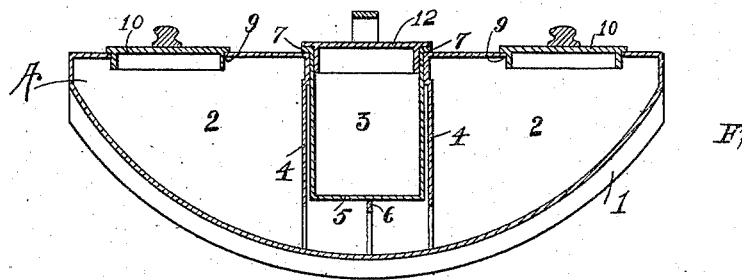
Figure 3:
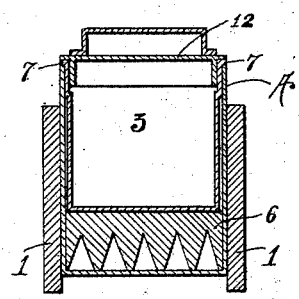
Figure 4:
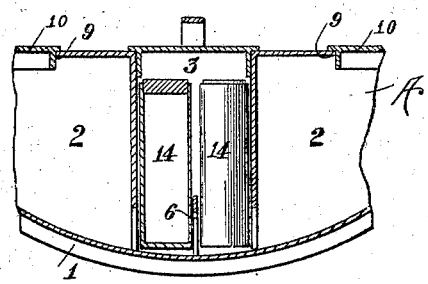

In the accompanying drawings: Figure 1 is a perspective view of the invention; Fig. 2 is a longitudinal sectional view; Fig. 3 is a transverse section; and Fig. 4 is a modification in section.

A represents a tank, which is preferably made semi-cylindrical and is mounted upon runners or rockers 1, 1. Ice compartments 2, 2 are formed at each end of the tank and the freezing compartment or chamber 3 is formed between the two ice chambers. Partitions 4, 4 are formed between the ice chambers and the freezing chamber. The lower edges or ends of the partitions 4 are serrated forming openings to admit the water from the melting ice to the freezing chamber where it comes in contact with the receptacle 5, which contains the cream to be frozen. A plate 6 is received in the base or bottom of the freezing chamber upon which the receptacle 5 is mounted. Flanges 7 are formed on the receptacle for supporting it upon the tank. Openings 9 are formed through the top of the tank for admitting the ice and salt in the ice chambers, and covers 10, 10 are received in the openings for closing the chambers. A cover 12 is received on the cream receptacle 5.

The ice and salt being placed in the ice chambers 2 of the tank and the cream placed in the receptacle 5, and the receptacle placed in the freezing chamber, the freezer is in readiness to be operated. The freezer is then rocked causing the melting of the ice and the salt water will pass from the ice chambers into the freezing chamber where it will come in contact with the cream receptacle for freezing the cream.

In the modification, I have shown molds 14, which are adapted to be received in the freezing chamber and separated by the plate 6. A great number of these molds can be placed in the chamber and the cream frozen in the same manner as with the large receptacle for freezing cream in large quantities or bulk.

With this invention the salt water from the ice will come in contact with the molds or freezing receptacle, causing the cream in the molds or receptacle to be frozen, the ice being prevented from coming in contact with the receptacle or molds by the partitions.

It is evident that more or less slight changes might be resorted to in the form and arrangement of the several parts described without departing from the spirit and scope of my invention, and hence I do not wish to be limited to the exact construction herein set forth, but:

Having fully described my invention, what I claim as new and desire to secure by Letters Patent, is:—

In an ice cream freezer, the combination with a tank, of rockers on the tank, ice chambers in the tank, a cover for the tank, partitions extending downward from the cover having openings therein at the bottom and inclosing a freezing chamber, a freezing receptacle supported upon the cover and extending into the freezing chamber, and a slotted plate in the freezing chamber for supporting the freezing receptacle.

In testimony whereof I affix my signature, in the presence of two witnesses.

THOS. JEFFERSON HARTON.

Witnesses:
J. C. TANDY,
A. ALLING.